(12) United States Patent
Takahashi

(10) Patent No.: US 9,591,160 B2
(45) Date of Patent: Mar. 7, 2017

(54) IMAGE READING APPARATUS

(71) Applicant: FUJI XEROX CO., LTD., Tokyo (JP)

(72) Inventor: Kaoru Takahashi, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/885,535

(22) Filed: Oct. 16, 2015

(65) Prior Publication Data

US 2016/0316085 A1   Oct. 27, 2016

(30) Foreign Application Priority Data

Apr. 27, 2015 (JP) ................................. 2015-090785

(51) Int. Cl.
| H04N 1/04 | (2006.01) |
| H04N 1/00 | (2006.01) |
| H04N 1/10 | (2006.01) |
| H04N 1/193 | (2006.01) |

(52) U.S. Cl.
CPC ....... *H04N 1/00795* (2013.01); *H04N 1/1061* (2013.01); *H04N 1/193* (2013.01); *H04N 2201/0081* (2013.01)

(58) Field of Classification Search
None
See application file for complete search history.

(56) References Cited

U.S. PATENT DOCUMENTS

| 8,488,217 | B2 | 7/2013 | Takahashi et al. |
| 2009/0263164 | A1* | 10/2009 | Koeda ............... G03G 15/0863 399/262 |
| 2015/0319329 | A1* | 11/2015 | Matsuzawa .......... H04N 1/0281 358/475 |

FOREIGN PATENT DOCUMENTS

JP   2011-024132 A   2/2011

OTHER PUBLICATIONS

Google Machine Translation of JP 2012175212 A from WIPO, Sep. 2012, Inventors: Kioka Hideakatsu.*

* cited by examiner

*Primary Examiner* — Benny Q Tieu
*Assistant Examiner* — Sunil Chacko
(74) *Attorney, Agent, or Firm* — Oliff PLC

(57) ABSTRACT

An image reading apparatus includes a light source that emits light that is to be applied to an original document, a light receiving portion that receives reflected light, which is reflected off the original document, and multiple light reflection members that guide the reflected light, reflected off the original document, to the light receiving portion. At least one of the multiple light reflection members is used as a light guide to guide light from the light source to the original document.

10 Claims, 3 Drawing Sheets

IMAGE READING APPARATUS

CROSS-REFERENCE TO RELATED APPLICATIONS

This application is based on and claims priority under 35 USC 119 from Japanese Patent Application No. 2015-090785 filed Apr. 27, 2015.

BACKGROUND

Technical Field

The present invention relates to image reading apparatuses.

SUMMARY

An image reading apparatus according to an aspect of the invention includes a light source that emits light that is to be applied to an original document, a light receiving portion that receives reflected light, which is reflected off the original document, and multiple light reflection members that guide the reflected light, reflected off the original document, to the light receiving portion. At least one of the multiple light reflection members is used as a light guide to guide light from the light source to the original document.

BRIEF DESCRIPTION OF THE DRAWINGS

An exemplary embodiment of the present invention will be described in detail based on the following figures, wherein.

DETAILED DESCRIPTION

Figure 1:
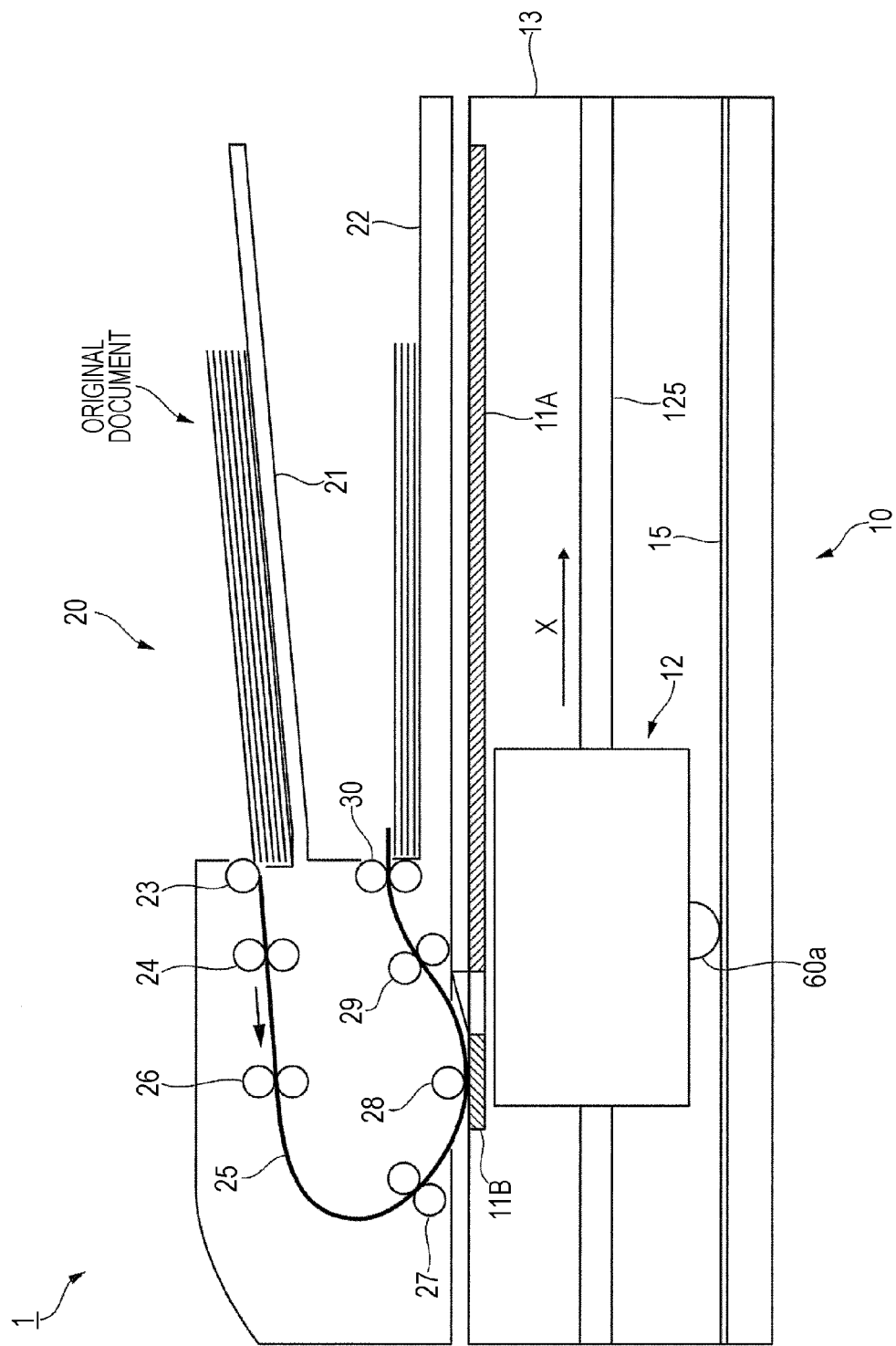
FIG. 1 illustrates the entire configuration of an image reading apparatus according to an exemplary embodiment.

Referring now to the drawings, an exemplary embodiment of the present invention is described.

FIG. 1 illustrates the entire configuration of an image reading apparatus 1 of an exemplary embodiment.

The image reading apparatus 1 according to the exemplary embodiment includes a scanner device 10, which reads an image of an original document by scanning the original document, and a document feeding device 20, which transports original documents one by one from a stack of original documents. Although not illustrated, the image reading apparatus 1 also includes an image processing device, which processes read images (image data) acquired by reading the original document, and a control device, which controls the components of the image reading apparatus 1.

The document feeding device 20 includes an original document receiving portion 21, which receives a stack of multiple original documents, and a discharged document receiving portion 22, which receives a stack of original documents that have been read.

The document feeding device 20 also includes a pick-up roller 23, which picks up original documents in the original document receiving portion 21, and a separation mechanism 24, which separates the original documents one from another.

The document feeding device 20 also includes a transport path 25, along which original documents are transported, and pre-registration rollers 26 and registration rollers 27, which are disposed on the transport path 25. The pre-registration rollers 26 transport separate original documents downward. The registration rollers 27 feed the original documents to the scanner device 10 while performing registration on the documents.

The document feeding device 20 also includes a platen roller 28, which helps transporting the original documents that are being read by the scanner device 10, outgoing rollers 29, which transport the original documents read by the scanner device 10 downstream, and discharge rollers 30, which discharge the read original documents to the discharged document receiving portion 22.

The scanner device 10 includes a first platen glass 11A, on which original documents in a static state are placed, and a second platen glass 11B, which transmits light for reading the original documents transported by the document feeding device 20.

The scanner device 10 also includes a reading unit 12, which reads original documents placed on the first platen glass 11A or original documents transported by the document feeding device 20, and a housing 13, which accommodates the reading unit 12.

The scanner device 10 also includes a moving mechanism (not illustrated), which includes a motor and moves the reading unit 12 in the lateral direction in FIG. 1 (sub-scanning direction indicated by the arrow "X" in FIG. 1), and a guide shaft 12S, which guides the reading unit 12.

The scanner device 10 also includes a guide rail 15 that is in contact with a sliding member 60a attached to the reading unit 12 and that supports the reading unit 12 from below. The guide rail 15 is disposed so as to extend in the sub-scanning direction.

Here, the image reading apparatus 1 according to the exemplary embodiment is described using a configuration including the document feeding device 20 as an example. However, the image reading apparatus 1 may have a configuration including, instead of the document feeding device 20, a platen cover (not illustrated) that holds an original document placed on the first platen glass 11A.

Figure 2:
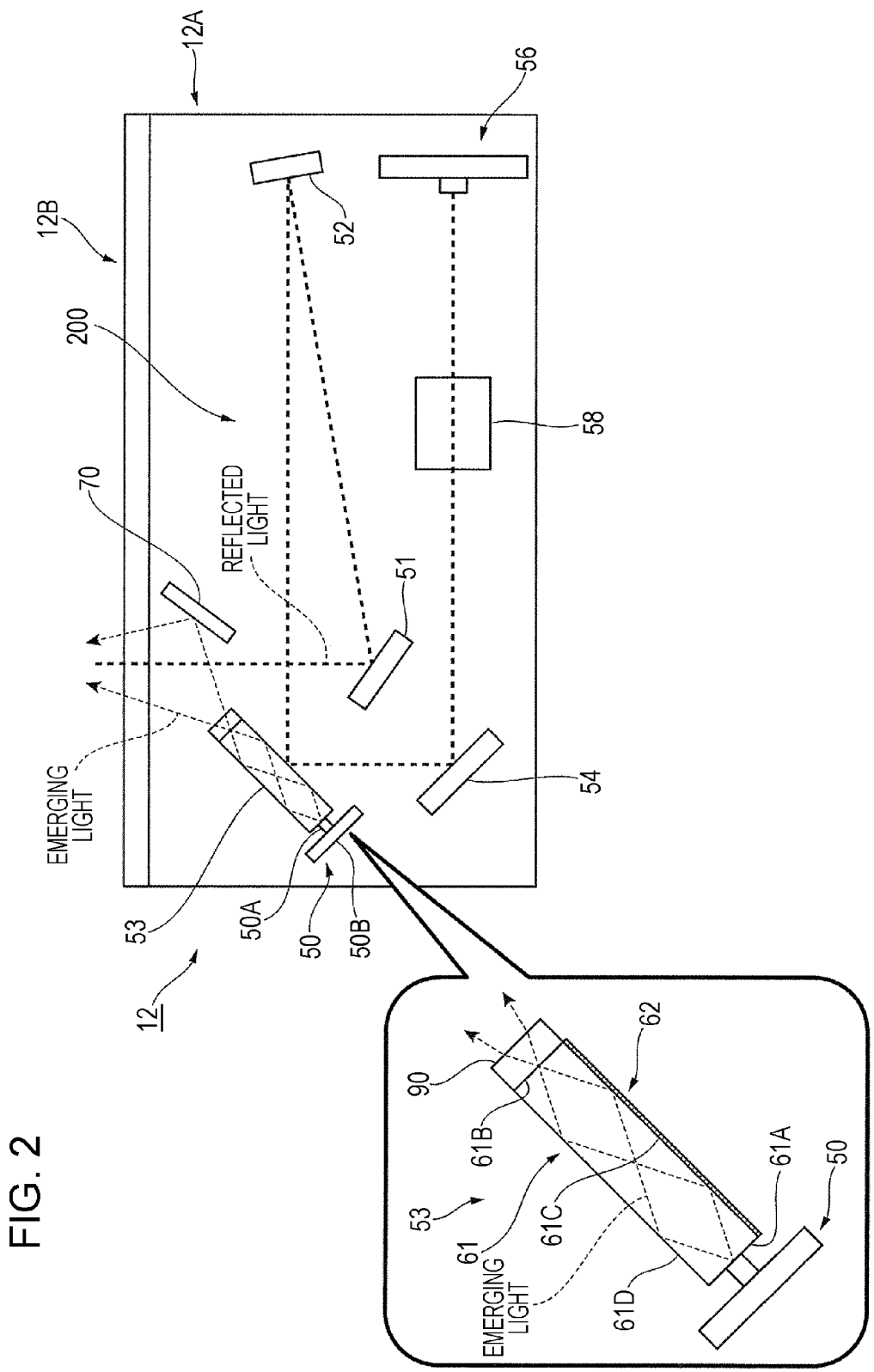
FIG. 2 illustrates the details of a reading unit.

FIG. 2 illustrates the details of the reading unit 12.

The reading unit 12 includes a light source 50, which emits light that is to be applied to original documents, and a reflection mirror 70, which reflects light emitted from the light source 50 (hereinafter referred to as "emerging light") toward original documents.

The reading unit 12 also includes a light receiving portion 56, which receives light reflected off the original documents (hereinafter referred to as "reflected light"), and a light guiding portion 200, which functions as a light guide unit that guides the reflected light to the light receiving portion 56.

The light guiding portion 200 includes multiple light reflection members (light reflection surfaces, or a first light reflection member 51 to a fourth light reflection member 54). These multiple light reflection members are used to guide the reflected light to the light receiving portion 56.

The reading unit 12 also includes an image formation lens 58, which optically contracts an optical image that it has received from the light guiding portion 200.

The light source 50 includes multiple light emitting diodes (LEDs) 50A and a substrate 50B, which supports the LEDs 50A. The multiple LEDs 50A are arranged in a main scanning direction (direction perpendicular to the plane of the drawing).

The light receiving portion 56 is formed of charge-coupled device (CCD) image sensors. Specifically, the light receiving portion 56 includes three line sensors corresponding to three colors of R, G, and B so as to be capable of detecting the components of the three colors of R, G, and B.

Each line sensor is disposed so as to extend in the main scanning direction. A photoelectric converter (photodiode (PD)) is disposed along each line sensor in the main scanning direction.

The light guiding portion 200 includes a first light reflection member 51, which reflects light reflected off an original document, a second light reflection member 52, which reflects light reflected off the first light reflection member 51, a third light reflection member 53, which reflects light reflected off the second light reflection member 52, and a fourth light reflection member 54, which reflects light reflected off the third light reflection member 53. The reflected light reflected off the fourth light reflection member 54 is directed to the light receiving portion 56 through the image formation lens 58.

Each of the first light reflection member 51 to the fourth light reflection member 54 includes a base member 61 and a light reflection surface 62.

The base member 61 is made of a transparent material such as acryl or glass. The base member 61 has a shape of a long rectangular parallelepiped, or a plate shape, and is disposed so as to extend in the main scanning direction. Examples of the material of the base member 61 include, besides acryl and glass, polycarbonate resin and polyimide resin.

The light reflection surface 62 is disposed on the surface of the base member 61.

More specifically, a side surface of the base member 61 has been subjected to vapor deposition of metal such as aluminum and this surface subjected to vapor deposition functions as the light reflection surface 62.

In the case where the base members 61 are to be formed from a resin material such as acryl, manufacturing of the first light reflection member 51 to the fourth light reflection member 54 starts with cutting of a resin sheet or plate into pieces to form the above-described rectangular parallelepiped base members 61. Subsequently, the base members 61 are subjected to vapor deposition of metal. Thus, light reflection members are individually formed on the first light reflection member 51 to the fourth light reflection member 54.

On the other hand, in the case where the base members 61 are to be formed from glass, manufacturing of the first light reflection member 51 to the fourth light reflection member 54 starts with preparing a glass sheet (plate). Then, the glass sheet has been subjected to vapor deposition of metal so that metal is deposited on one surface of the glass sheet. Thereafter, the glass sheet is cut into pieces. Thus, light reflection members are individually formed on the first light reflection member 51 to the fourth light reflection member 54.

The case of forming the base members 61 from glass dispenses with performing vapor deposition on the individual base members 61 obtained by cutting a sheet material into pieces, whereby the manufacturing process is further simplified than that in the case of forming the base members 61 from resin materials.

In the exemplary embodiment, the third light reflection member 53 is used as a light guide.

Emerging light emitted from the light source 50 is guided by the third light reflection member 53 to an original document, or guided to an original document through the inside of the third light reflection member 53.

More specifically, in this exemplary embodiment, the emerging light emitted from the light source 50 enters the third light reflection member 53 from a first end face 61A of the base member 61 of the third light reflection member 53. Then, inside the third light reflection member 53, the emerging light is (totally) reflected in a repeated manner. The emerging light then is directed to a second end face 61B of the base member 61. Thereafter, the emerging light emerges from the second end face 61B and shines on the original document.

In this exemplary embodiment, the emerging light diffuses in the main scanning direction inside the base member 61.

Here, as described above, the base member 61 of the third light reflection member 53 has the first end face 61A, from which the emerging light emitted from the light source 50 enters. The base member 61 also has the second end face 61B, from which the emerging light emerges, opposite to the first end face 61A.

The base member 61 also has a first side face 61C and a second side face 61D, which connect the first end face 61A and the second end face 61B together. In this exemplary embodiment, the first side face 61C has been subjected to vapor deposition of aluminum and the light reflection surface 62 is disposed on the first side face 61C.

The base member 61 also has end faces on both ends in the longitudinal direction of the base member 61 (on both ends in the main scanning direction).

Here, in this exemplary embodiment, the emerging light emitted from the light source 50 is guided using the inside (inner surfaces) of the third light reflection member 53 in the manner described above. In this exemplary embodiment, the reflected light (light reflected off the original document) is reflected using the outer surface of the third light reflection member 53 as a light reflection surface.

Here, the emerging light may enter the base member 61 of the third light reflection member 53 from a portion other than the first end face 61A. For example, the emerging light may enter the base member 61 from an end face at the end in the longitudinal direction of the base member 61.

Referring to FIG. 1 and FIG. 2, the operation of the image reading apparatus 1 is described.

Firstly, the operation of reading an original document placed on the first platen glass 11A (FIG. 1) is described.

In the case where an original document placed on the first platen glass 11A is to be read, the reading unit 12 is moved in the sub-scanning direction by a driving mechanism, not illustrated.

At this time, light from the light source 50 (see FIG. 2) is applied to a surface of the original document that is to be read. The light reflected off the original document is reflected off the first light reflection member 51, the second light reflection member 52, the third light reflection member 53, and the fourth light reflection member 54 and then guided to the image formation lens 58. Thereafter, the reflected light passes through the image formation lens 58 and arrives at the light receiving portion 56.

Here, the CCD image sensors included in the light receiving portion 56 are one-dimensional sensors and perform processing per line. When the reading unit 12 moves further in the sub-scanning direction, the reading unit 12 reads the subsequent line of the original document. By performing this process over the entirety of the original document, reading of one original document is complete.

In the case, on the other hand, where an original document is transported by the document feeding device 20, the reading unit 12 is located below the second platen glass 11B (see FIG. 1). Then, the light reflected off a first line of the original document (light reflected off a portion of the original document facing the second platen glass 11B) is reflected off the first light reflection member 51, the second light reflection member 52, the third light reflection member 53, and the fourth light reflection member 54 and then guided to the image formation lens 58. Thereafter, the reflected light passes through the image formation lens 58 and arrives at the light receiving portion 56.

Subsequently, when the document feeding device 20 transports the original document further, the subsequent line of the original document is read by the reading unit 12. The original document is kept being transported further, so that an image corresponding to one line of the original document (an image corresponding to one line extending in the sub-scanning direction) is sequentially read by the reading unit 12. When the trailing end of the original document passes over the second platen glass 11B, reading of one original document is complete.

Referring again to FIG. 2, the reading unit 12 is described.

As described above, the reading unit 12 includes the light source 50, the reflection mirror 70, the first light reflection member 51 to the fourth light reflection member 54, the image formation lens 58, and the light receiving portion 56.

The reading unit 12 also includes a housing 12A that accommodates these components. The reading unit 12 also includes a covering member 12B that covers an opening formed at an upper portion of the housing 12A.

Here, in this exemplary embodiment, the first light reflection member 51 to the fourth light reflection member 54 are supported by the housing 12A. In this exemplary embodiment, the first light reflection member 51 to the fourth light reflection member 54 are supported by a common supporting member.

A configuration in which a light source and a light guide are disposed on a covering member is known as an existing technology. It is conceivable, also in this exemplary embodiment, to dispose the light source 50 and the third light reflection member 53 functioning as a light guide on the covering member 12B, as in the case of the existing technology.

In this case, however, the third light reflection member 53 and the other light reflection members (the first light reflection member 51, the second light reflection member 52, and the fourth light reflection member 54) may be misaligned with one another, so that the quality of the read image may be degraded.

To be more specific, in this configuration, the covering member 12B, which is a member separate from the housing 12A, is attached to the housing 12A. Thus, positional displacement between the housing 12A and the covering member 12B would cause misalignment between the third light reflection member 53 and the other light reflection members. This misalignment may cause degradation of the quality of the read image.

In this exemplary embodiment, in contrast, the first light reflection member 51 to the fourth light reflection member 54 are supported by the housing 12A, which is a common supporting member, as described above. To be more specific, the first light reflection member 51 to the fourth light reflection member 54 are supported by the same member (single member).

In this case, misalignment is less likely to occur between the first light reflection member 51 to the fourth light reflection member 54, whereby the degradation of the quality attributable to misalignment is suppressed.

In this exemplary embodiment, as illustrated in FIG. 2, the third light reflection member 53, which is located closest to the original document among the multiple light reflection members, is used as a light guide. To be more specific, the third light reflection member 53 located at the highest position in the vertical direction in FIG. 2 among the multiple light reflection members is used as a light guide. This configuration enhances the degree of gathering light applied to the original document compared to the configuration where a light reflection member disposed away from the original document is used as a light guide.

In this exemplary embodiment, although not illustrated, a light diffusion board 90 is attached to the second end face 61B of the third light reflection member 53.

The light source 50 according to the exemplary embodiment is a so-called point light source and likely to have uneven brightness. In this exemplary embodiment, light is diffused using the light diffusion board 90 to reduce unevenness in brightness.

The light diffusion board 90 is formed of, for example, a board-shaped member having protrusions and recesses on its surface.

Figure 3:
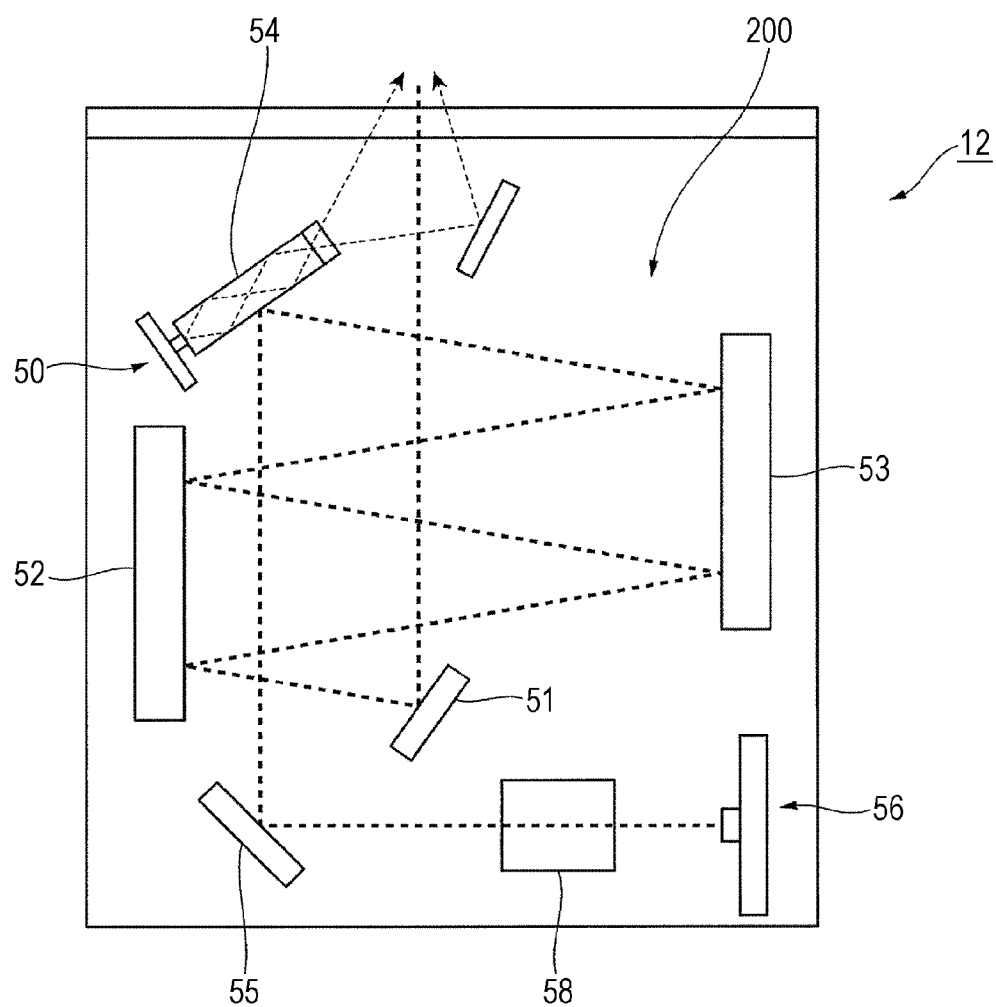
FIG. 3 illustrates another example of the configuration of the reading unit.

FIG. 3 illustrates an example of another configuration of the reading unit 12.

This example configuration includes five light reflection members, a first light reflection member 51 to a fifth light reflection member 55. In this example configuration, the fourth light reflection member 54 is disposed at a position closest to an original document among the light reflection members and used as a light guide.

In this example configuration, in the process where reflected light is directed to the fourth light reflection member 54 from the first light reflection member 51, the reflected light is reflected multiple times by the second light reflection member 52 and the third light reflection member 53.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus, comprising:
    a light source that emits emerging light that is to be applied to an original document;
    a light receiving portion that receives reflected light, which is reflected off the original document; and
    a plurality of light reflection members, each of the plurality of light reflection members guiding the reflected light, reflected off the original document, to the light receiving portion,
    wherein at least one of the plurality of light reflection members is used as a light guide to guide the emerging light from the light source to the original document.

2. The image reading apparatus according to claim 1, wherein one of the plurality of light reflection members disposed at a position closest to the original document among the plurality of light reflection members is used as the light guide.

3. The image reading apparatus according to claim 1, wherein the at least one light reflection member used as the light guide has a first end face, from which light from the light source enters, a second end face, which is located opposite to the first end face and from which light emerges, and a side face that connects the first end face and the second end face together, and wherein the reflected light is reflected off the side face of the at least one light reflection member used as the light guide.

4. The image reading apparatus according to claim 1, wherein a portion of the at least one light reflection member used as the light guide at which the reflected light is reflected has been subjected to vapor deposition of metal.

5. The image reading apparatus according to claim 1, wherein the at least one light reflection member used as the light guide and the light reflection members other than the at least one light reflection member used as the light guide are supported by a common supporting member.

6. The image reading apparatus according to claim 1, wherein the light source, the light receiving portion, and the light reflection members are disposed in a movable reading unit and an image of the original document placed on the image reading apparatus is read as the reading unit moves.

7. An image reading apparatus, comprising:
a light source;
an emerging light guide that guides emerging light emitted from the light source to an original document;
a light receiving portion that receives reflected light, reflected off the original document; and
a reflected light guiding unit that guides the reflected light, reflected off the original document, to the light receiving portion using a surface of the emerging light guide as a reflection surface that reflects the reflected light.

8. The image reading apparatus according to claim 7, wherein the reflected light guiding unit uses an outer surface of the emerging light guide as the reflection surface.

9. The image reading apparatus according to claim 1, wherein the light guide is positioned between the light source and the original document, an external surface of the light guide being positioned in a light path between the original document and the light receiving portion such that it acts as one of the plurality of light reflection members.

10. The image reading apparatus according to claim 7, wherein the emerging light guide is positioned between the light source and the original document, the surface of the emerging light guide being positioned in a light path between the original document and the light receiving portion.

* * * * *